US012791070B2

(12) United States Patent
Prahst

(10) Patent No.: US 12,791,070 B2
(45) Date of Patent: Nov. 10, 2026

(54) BRAKE ASSEMBLY

(71) Applicant: Dr. Ing. h.c. F. Porsche Aktiengesellschaft, Stuttgart (DE)

(72) Inventor: Alexander Prahst, Freudental (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 376 days.

(21) Appl. No.: 18/571,333

(22) PCT Filed: Jun. 10, 2022

(86) PCT No.: PCT/EP2022/025268
§ 371 (c)(1),
(2) Date: Dec. 18, 2023

(87) PCT Pub. No.: WO2022/268359
PCT Pub. Date: Dec. 29, 2022

(65) Prior Publication Data
US 2024/0280153 A1 Aug. 22, 2024

(30) Foreign Application Priority Data
Jun. 22, 2021 (DE) ..................... 10 2021 116 119.3

(51) Int. Cl.
*F16D 65/00* (2006.01)
*F16D 55/10* (2006.01)
(Continued)

(52) U.S. Cl.
CPC ............. *F16D 65/22* (2013.01); *F16D 55/10* (2013.01); *F16D 55/36* (2013.01); *F16D 65/0031* (2013.01)

(58) Field of Classification Search
CPC ............. F16D 55/40; F16D 2055/0087; F16D 2055/0054; F16D 55/02–20; F16D 65/0031; F16D 55/10–12
See application file for complete search history.

(56) References Cited

U.S. PATENT DOCUMENTS 2,925,889 A * 2/1960 Albright ................. F16D 55/10 188/18 R
2,930,452 A * 3/1960 Klaue ..................... F16D 55/14 188/71.4
(Continued)

FOREIGN PATENT DOCUMENTS

DE 1800549 A1 5/1970
DE 102016105169 A1 9/2017
(Continued)

OTHER PUBLICATIONS

Office Action (Notice of Reasons for Refusal) issued Jan. 30, 2025, by the Japanese Patent Office in corresponding Japanese Patent Application No. 2023-573463. (1 page).
(Continued)

*Primary Examiner* — Ernesto A Suarez
*Assistant Examiner* — Lillian T Nguyen
(74) *Attorney, Agent, or Firm* — Buchanan Ingersoll & Rooney PC

(57) ABSTRACT

A brake assembly with a first brake disc and with a second brake disc, which are arranged spaced apart from one another and connected to one another in a rotationally fixed manner and can be arranged such that they can rotate about a common axis of rotation, in particular on a wheel carrier. A brake caliper with brake pistons is arranged axially between the two brake discs, wherein at least one first brake piston is provided, by way of which pressure can be applied to a first arranged brake pad to press it against the first brake disc, and wherein optionally at least one second brake piston is provided, by way of which pressure can be applied to a second arranged brake pad to press it against the second brake disc.

21 Claims, 9 Drawing Sheets

(51) Int. Cl.
*F16D 55/36* (2006.01)
*F16D 65/22* (2006.01)

(56) References Cited

U.S. PATENT DOCUMENTS

| | | | | | |
|---|---|---|---|---|---|
| 2,998,103 | A * | 8/1961 | Klaue | F16D 55/14 188/72.2 |
| 7,353,919 | B2 * | 4/2008 | Christ | F16D 65/18 188/71.6 |
| 11,796,019 | B2 * | 10/2023 | Kaufmann | F16D 65/0031 |
| 2002/0038742 | A1 | 4/2002 | Bunker | |
| 2006/0049005 | A1 | 3/2006 | Hendrich et al. | |
| 2010/0065387 | A1 | 3/2010 | Tsiberidis | |
| 2014/0054121 | A1 * | 2/2014 | Hummel | F16D 65/0031 55/522 |
| 2015/0107942 | A1 * | 4/2015 | Isono | F16D 55/40 188/71.3 |
| 2018/0328431 | A1 | 11/2018 | Crippa et al. | |
| 2023/0383799 | A1 * | 11/2023 | Shahin | F16D 65/0031 |

FOREIGN PATENT DOCUMENTS

| | | | |
|---|---|---|---|
| FR | 2505280 | A1 | 11/1982 |
| JP | 2010508481 | A | 3/2010 |
| JP | 2018533706 | A | 11/2018 |

OTHER PUBLICATIONS

International Search Report and Written Opinion for International Application No. PCT/EP2022/025268, dated Nov. 7, 2022, 8 pages.
Great Britain Examination Report issued Mar. 4, 2025, by the Great Britain Intellectual Property Office in corresponding Great Britain Application No. GB2400748.6. (2 pages).

* cited by examiner

BRAKE ASSEMBLY

CROSS-REFERENCE TO RELATED APPLICATION

This U.S. National Phase patent application claims priority to PCT International Patent Application No. PCT/EP2022/025268, filed Jun. 10, 2022, which claims priority to German Patent Application No. 10 2021 116 119.3, filed Jun. 22, 2021, the contents of such applications being incorporated by reference herein in their entirety.

FIELD OF THE INVENTION

The invention relates to a brake assembly, in particular for a wheel of a motor vehicle.

BACKGROUND OF THE INVENTION

In motor vehicles with an electric motor as the drive motor, i.e. in electric vehicles or in hybrid vehicles, braking energy is increasingly recovered by means of recuperation in order to increase energy efficiency. Further reducing driving resistances in such motor vehicles to increase energy efficiency is an objective as well. With respect to driving resistances, the attempt is being made to further reduce the residual torques on the brake calipers. Due to more frequent recuperation, the wheel brakes are used less and less, which has the disadvantage that the brakes are no longer continuously ground down, with the result that, depending on the meteorological effects and climate conditions, the friction coefficient of the brake can be greatly reduced and, in extreme cases, the brake can also become sooty or stick.

Also, it is the case with today's brakes that brake dust enters the environment as particulate matter and contributes to particulate matter pollution, which is generally undesirable.

SUMMARY OF THE INVENTION

The object of the present invention is to create a brake assembly that has good functionality over its service life and brakes reliably when required, and yet is improved in terms of particulate matter emission. A significant reduction of particulate matter emission can optionally be attainable.

This object is achieved by the features of claim 1.

One embodiment example of the invention relates to a brake assembly, in particular of a wheel of a motor vehicle, with a first brake disc and with a second brake disc, which are arranged spaced apart from one another and connected to one another in a rotationally fixed manner and can be arranged such that they can rotate about a common axis of rotation, in particular on a wheel carrier, wherein a brake caliper with brake pistons is arranged axially between the two brake discs, wherein at least one first brake piston is provided, by means of which pressure can be applied to a first arranged brake pad to press it against the first brake disc, and wherein optionally a second brake piston is provided, by means of which pressure can be applied to a second arranged brake pad to press it against the second brake disc, or wherein at least one first brake piston is provided, by means of which pressure can be applied to a first arranged brake pad to press it against the first brake disc and by means of which pressure can at least indirectly be applied to a second arranged brake pad to press it against the second brake disc, wherein the brake caliper comprises a base body and/or lid, which extends radially outward over the two brake discs like a lid and shields the spatial region between the brake discs from the outside. This results in a basically closed brake assembly, which is largely insensitive to climate and weather effects and also has the advantage that produced brake dust can be collected and stored. If only at least one first brake piston is provided, it can be configured as a 1 piston floating frame caliper, in which the first piston applies pressure to the first brake pad to press it against the first brake disc and the reaction force pushes the frame on the opposite side against the second brake pad and applies pressure to it to press it against the second brake disc.

In one embodiment example, it is also expedient if the brake discs have inner surfaces which face toward one another and outer surfaces which face away from one another, wherein the brake pads are pressed by the brake pistons only against the inner surfaces of the brake discs which face toward one another. Pressure is thus applied to the respective brake disc on only one side, the inner side, for braking, so that the produced brake dust can accumulate in the spatial region between the brake discs and collected and stored in a targeted manner without allowing large quantities of brake dust to escape.

It is also expedient if the outer surfaces of the brake discs or at least one outer surface of one brake disc serve to cool and/or increase flexural rigidity in that ribs are provided on the outer surface of the brake disc to improve cooling and/or increase the flexural rigidity of the brake disc. This increases rigidity, because pressure is applied to only one side of the brake discs for braking. This can also improve cooling of the brake and the cooling fluid being used. The cooling fluid can optionally be air.

In one embodiment example, it is also expedient if a counter bearing engages on the outer surface of at least one of the brake discs or both brake discs for axially supporting the brake disc against axial bending. This can further increase the rigidity in order to reduce bending of the brake discs.

In another embodiment example, it is also expedient if a labyrinth seal is provided between the base body and/or the lid and the radial outer region of the brake discs or at least one brake disc to seal the spatial region between the two brake discs. This ensures that only an insignificant quantity of brake dust can escape.

It is also advantageous if the base body and/or the lid and/or the brake caliper are provided with cooling air channels and/or cooling air openings for passing cooling air in and/or through. This can improve the cooling of the brake assembly, in particular also due to the air conveying effects of the brake discs themselves.

In another embodiment example, it is also advantageous if a brake dust collection and storage assembly is provided on the base body and/or on the lid or adjacent thereto, by means of which brake dust can be collected and stored. This ensures that the brake dust is stored in a spatially limited manner and is not evenly distributed in the spatial region between the two brake discs, so that the stored brake dust can also be removed during servicing. The brake dust can thus be arranged of properly and is not released into the environment in an uncontrolled manner.

It is also expedient if the brake dust collection and storage assembly is fastened to the base body, the lid and/or the wheel carrier by means of at least one holder or is formed by the base body, the lid. This makes it possible to achieve a permanently secure arrangement and/or integration.

It is also advantageous if the brake dust collection and storage assembly comprises a braid, in particular a metal braid, which can store the brake dust and is in particular configured such that it can be replaced. This makes it possible to cost-effectively create a repository for the brake dust.

It is also advantageous if the brake dust collection and storage assembly comprises a collecting plate to collect the brake dust which extends substantially in circumferential direction and is in particular configured such that it can be replaced. This makes it possible to collect the brake dust in a targeted manner.

BRIEF DESCRIPTION OF THE DRAWINGS

The invention is described in detail in the following on the basis of an embodiment example with reference to the drawing. The drawing shows.

DETAILED DESCRIPTION OF THE INVENTION

Figure 1:
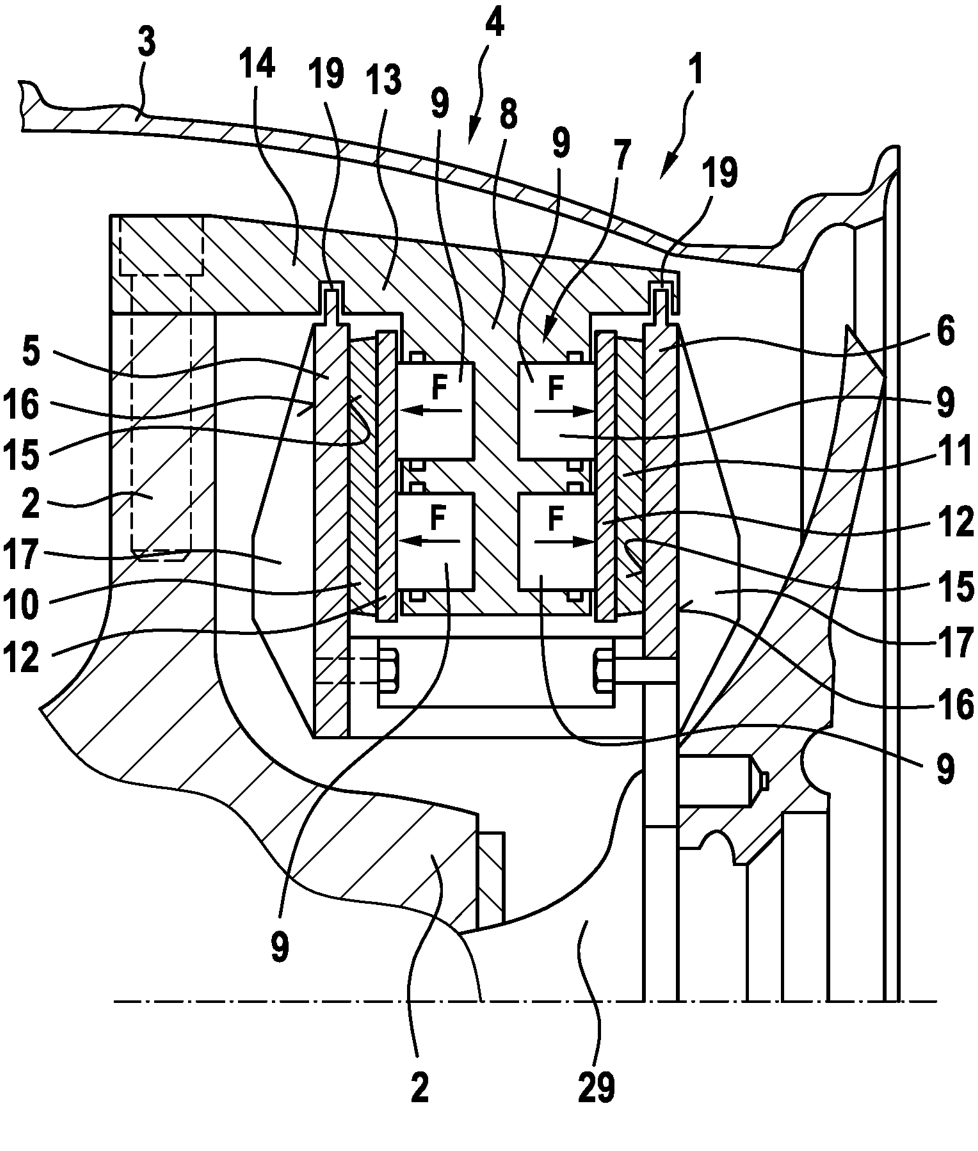
FIG. 1 a schematic partial sectional view of a first embodiment example of a brake assembly according to the invention, FIG. 2 a schematic partial sectional view of a second embodiment example of a brake assembly according to the invention, FIG. 3 a further schematic partial sectional view of the second embodiment example of the brake assembly according to the invention as shown in FIG. 2, FIG. 4 a schematic partial sectional view of a third embodiment example of a brake assembly according to the invention, FIG. 5 a schematic partial sectional view of a fourth embodiment example of a brake assembly according to the invention, FIG. 6 a schematic illustration of an outer surface of a brake disc with a rib design and cooling channels, FIG. 7 a schematic partial sectional view of a fifth embodiment example of a brake assembly according to the invention, FIG. 8 a schematic partial sectional view of a sixth embodiment example of a brake assembly according to the invention, FIG. 9 a schematic, unwound illustration of cooling air openings and cooling air channels, FIG. 10 a schematic, unwound illustration of cooling air openings and cooling air channels and their throughflow, FIG. 11 a schematic view of an embodiment example of a brake disc in section, and FIG. 12 a side view of the brake disc of FIG. 11.
Figure 2:
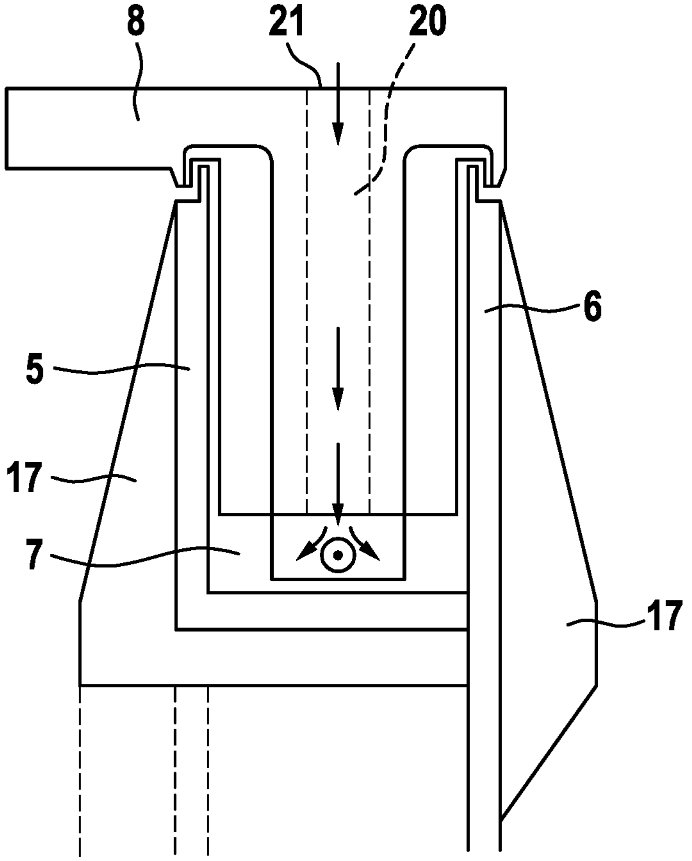
Figure 3:
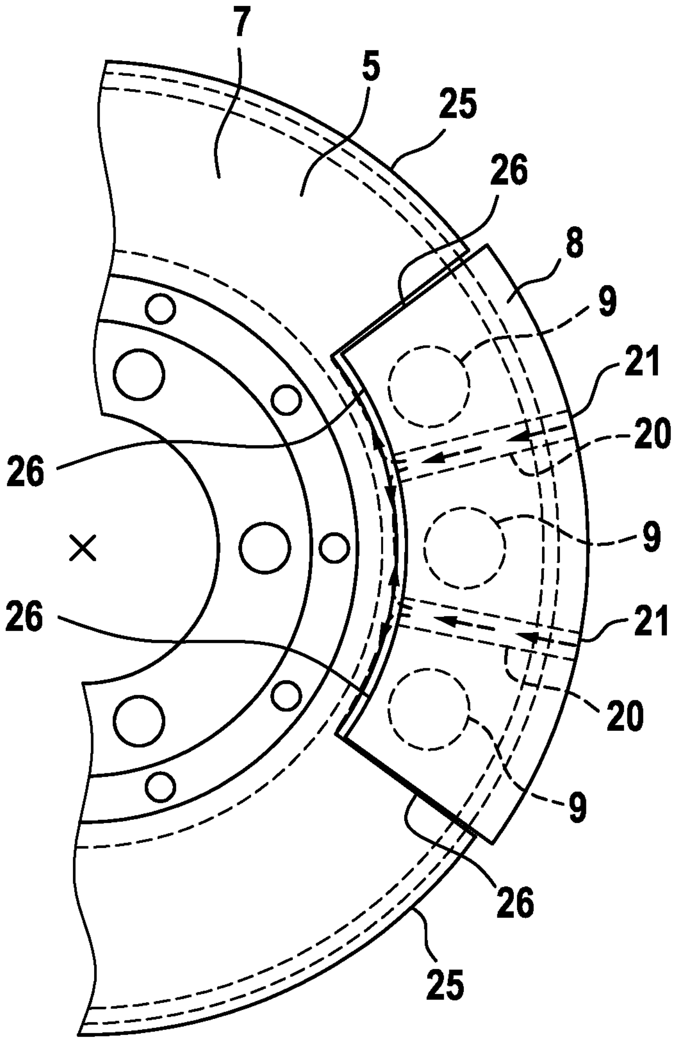

In a schematic partial sectional view, FIG. 1 shows a brake assembly 1 of a wheel of a motor vehicle, wherein a rim 3 of a wheel 4 can be seen on the wheel carrier 2.

The motor vehicle is in particular a motor vehicle with an internal combustion engine with a purely electric drive (BEV) or configured as a hybrid vehicle with an internal combustion engine and an electric motor as the drive motors (HEV, PHEV). PHEV stands for plug-in hybrid vehicle.

The brake assembly 1 comprises a first brake disc 5 and a second brake disc 6, which are arranged spaced apart from one another and are connected to one another in a rotationally fixed manner and can be arranged such that they can rotate about a common axis of rotation, in particular on a wheel hub 29.

Between the two brake discs 5, 6 there is a spatial region 7, in which the brake caliper 8 with the brake pistons 9 is arranged. A brake caliper 8 with at least one brake piston 9, in particular multiple brake pistons 9, is accordingly arranged axially between the two brake discs 5, 6. At least one first brake piston 9 is provided, by means of which pressure can be applied to a first arranged brake pad 10 to press it against the first brake disc 5, and also at least one second brake piston 9 is provided, by means of which pressure can be applied to a second arranged brake pad 11 to press it against the second brake disc 6. The brake caliper 8 is supported by the wheel carrier 2.

A respective back plate 12 is provided between the brake pistons 9 and the respective brake pad 10, 11 to equalize the pressing force from the brake pistons 9 onto the brake pad 10, 11.

The brake caliper 8 also comprises a base body 13 and/or lid 14, which extends radially outward over the two brake discs 5, 6 like a lid and shields the spatial region 7 between the brake discs 5, 6 from the outside. This protects the spatial region 7 with the aggregates and components arranged therein from weather, dirt and climate and makes it difficult for brake dust to escape. However, this type of encapsulation also concentrates the generated friction heat. The base body 13 and the lid 14 can optionally also be combined.

FIG. 1 shows that the brake discs 5, 6 comprise inner surfaces 15 which face toward one another and outer surfaces 16 which face away from one another, wherein the brake pads 10, 11 are pressed by the brake pistons 9 only against the inner surfaces of the brake discs 5, 6 which face toward one another. An axial force consequently acts on the brake discs 5, 6 from the inside out, which would cause said brake discs to bend outward.

It is therefore advantageous if the outer surfaces 16 of the brake discs 5, 6 or at least one outer surface 16 of a brake disc 5, 6 serve to cool and/or increase the flexural rigidity of the brake disc 5, 6 in that ribs 17 are provided on the outer surface 16 of the brake disc 5, 6 to improve cooling and/or increase the flexural rigidity of the brake disc 5, 6.

Figure 4:
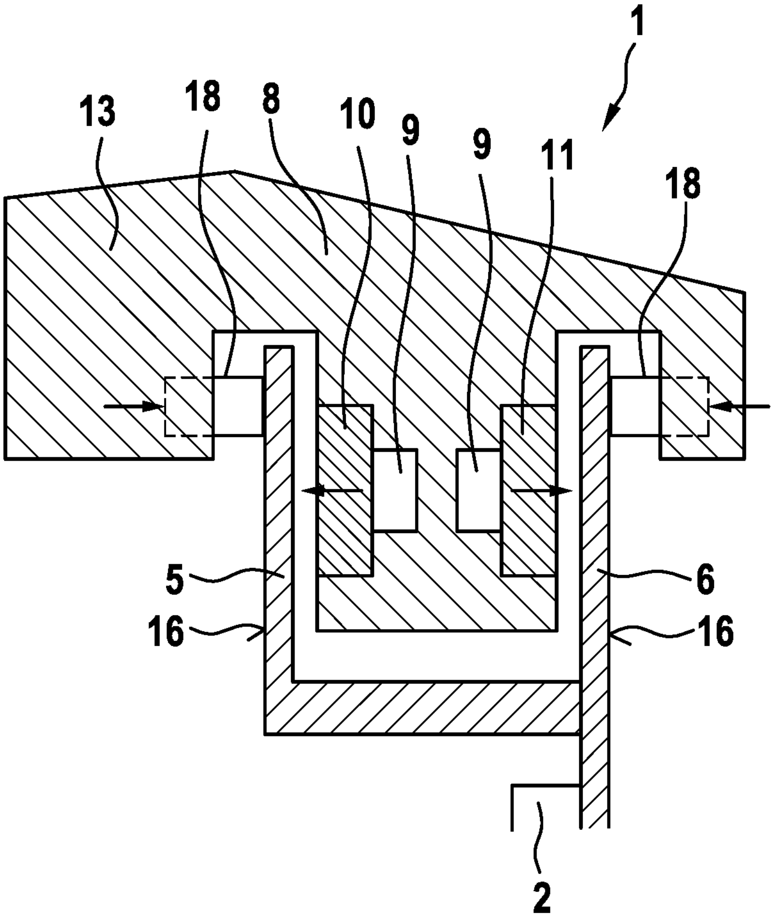

FIG. 4 shows an alternative illustration without ribs, wherein a counter bearing 18 engages on the outer surface 16 of at least one of the brake discs 5, 6 or both brake discs 5, 6 for axially supporting the brake disc 5, 6 against axial bending. The counter bearings 18 are supported on the brake caliper 8 or on the base body 13 of the brake caliper 8. The counter bearing 18 can be configured as a floating caliper, for example. The design with counter bearing 18 can, however, also be provided in combination with the ribs 17 as shown in FIG. 1.

FIG. 1 also shows that a labyrinth seal 19 is provided between the base body 13 and/or the lid 14 and the radial outer region of the brake discs 5, 6 or at least one brake disc 5, 6 to seal the spatial region 7 between the two brake discs 5, 6.

FIGS. 2, 3, 5 and 7 to 10 show different embodiment examples of brake assemblies 1 in different illustrations, in which the base body 13 and/or the lid 14 and/or the brake caliper 8 are provided with cooling air channels 20 and/or cooling air openings 21 or are configured to pass cooling air in and/or through. Air can thus pass through the brake caliper 8 into the spatial region 7 and flow through or past the brake pad 10, 11, the brake disc 5, 6, and the brake caliper 8 itself to effectively cool the brake fluid. The fluid path of the air can be approximately S-shaped, see FIG. 7 or 8.

Figure 9:
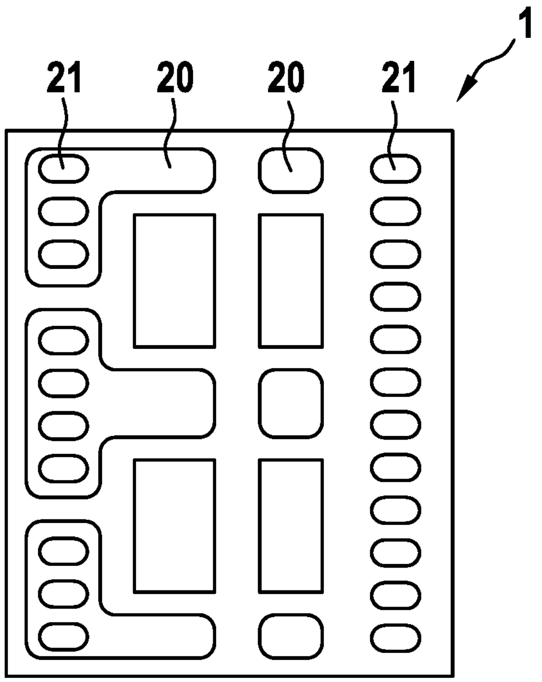
Figure 10:
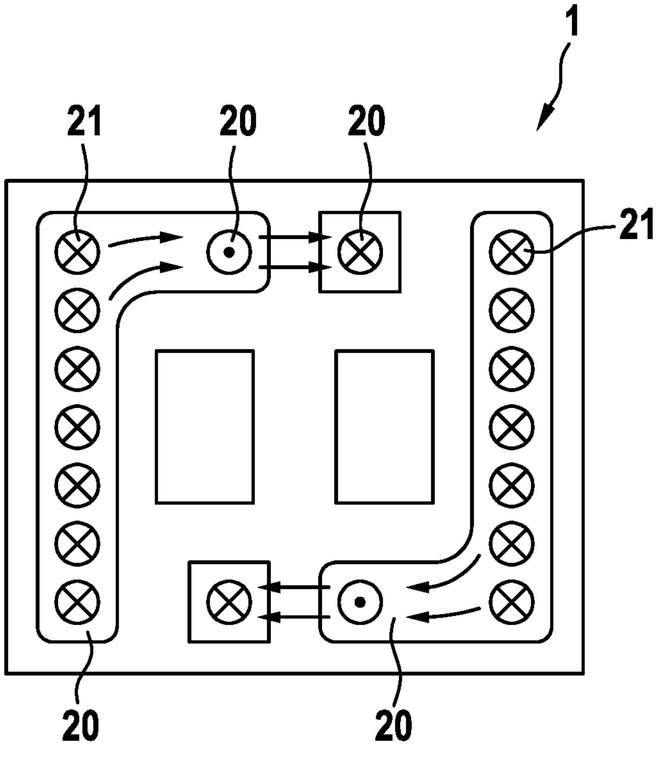

According to FIGS. 9 and 10, the air can flow into different cooling air openings 21 and then be combined and directed into cooling air channels 20. The lid 14 can be configured such that cooling air channels 20 can be bypassed or additional manifolds 28 can be used.

Figure 6:
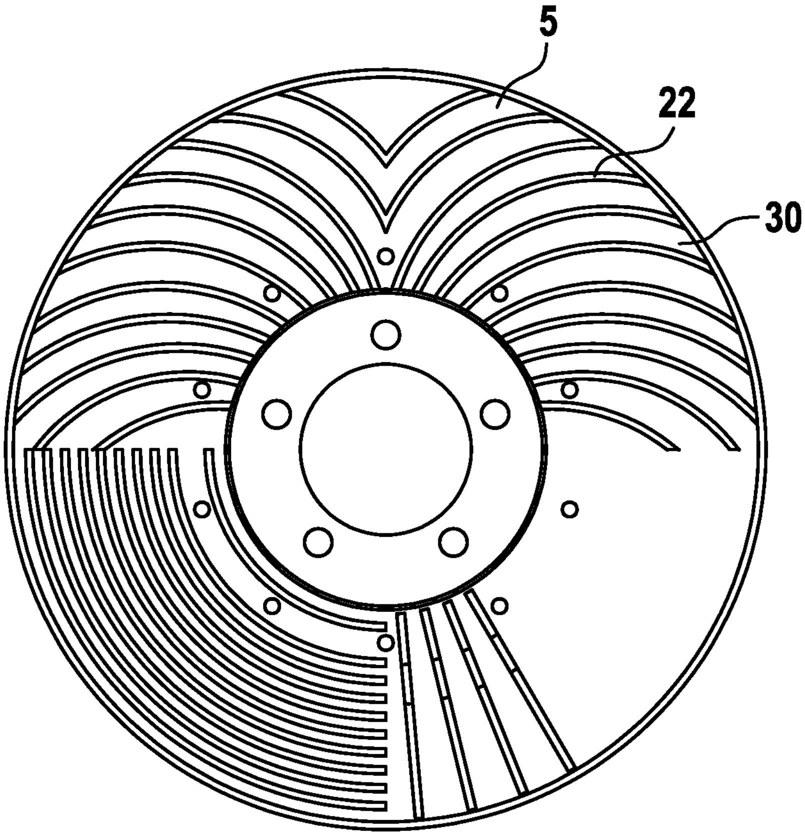
Figure 7:
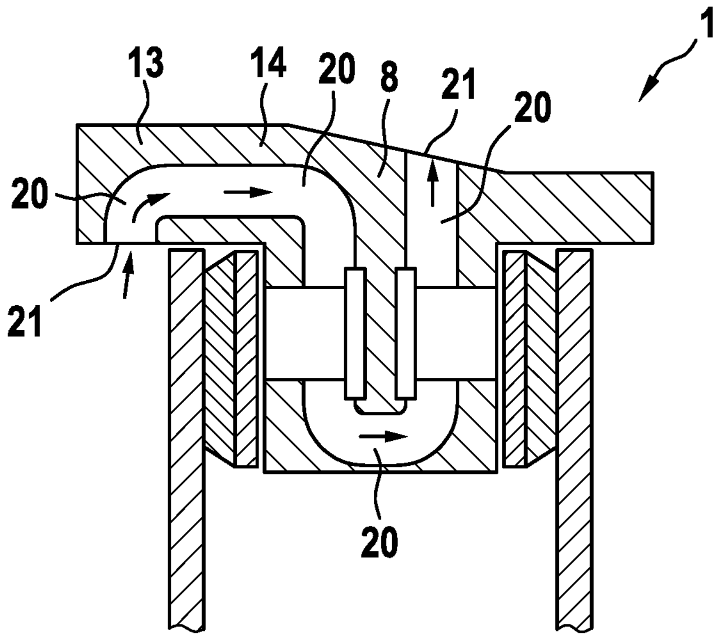
Figure 8:
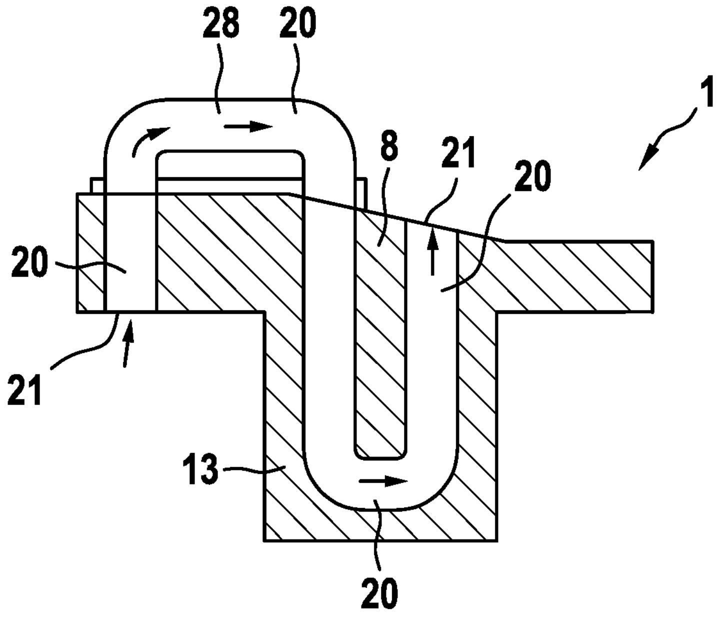

Grooves 30 which allow cooling air to flow through can be provided in the brake discs 5, 6 as well, see FIG. 6 for example. The grooves 30 are separated from one another by webs 22, wherein the grooves 30 or the webs 22 can be configured and arranged such that they are forward-curved, backward-curved, radial or concentric. The webs 22 create an air conveyance effect in order to let the cooling air flow through the grooves 30. The webs 22 and the grooves 30 can be provided on one side of the brake discs 5, 6 or on both sides of the brake discs 5, 6.

This also makes it possible to prevent nonetheless penetrating water or dirt from entering the region of the brake pads 10, 11 and the corresponding friction surfaces.

Figure 5:
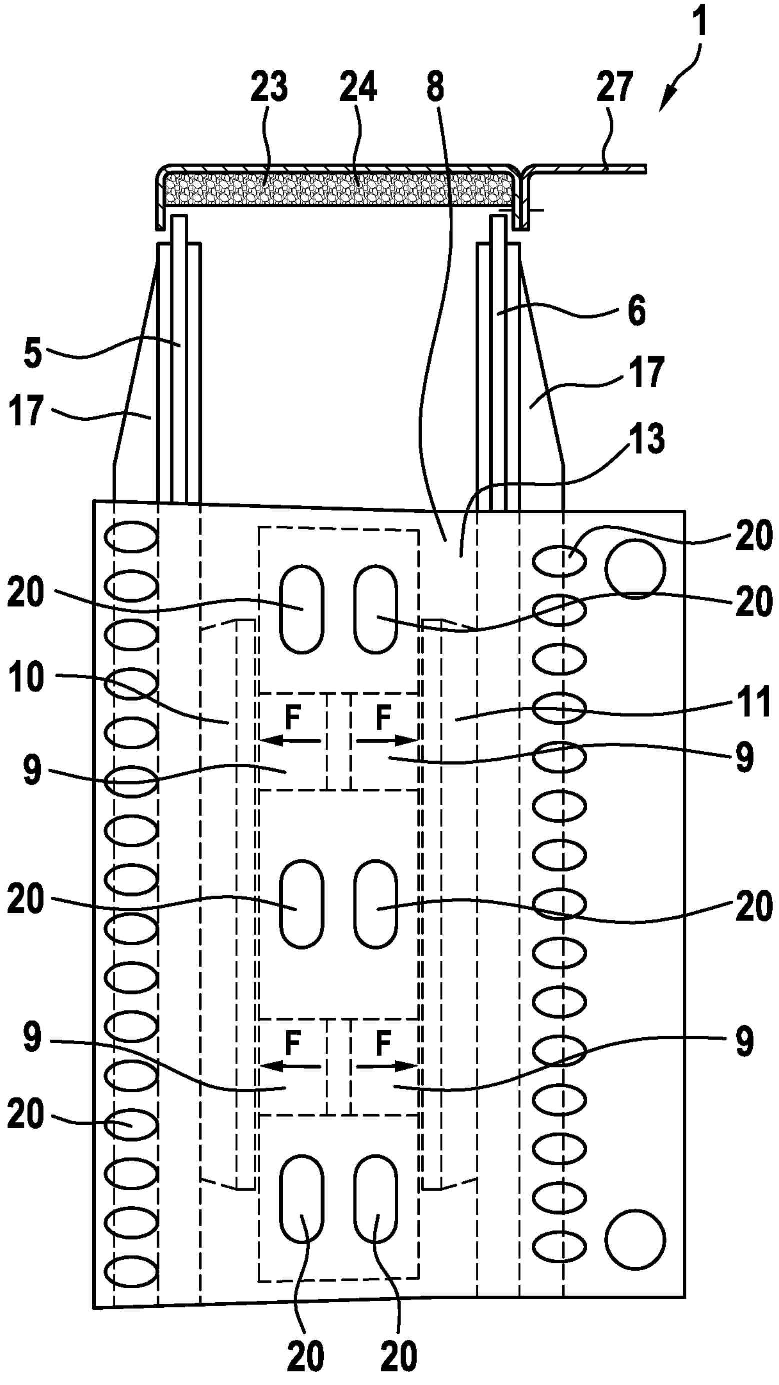

In one advantageous embodiment example, see FIG. 5 for example, a brake dust collection and storage assembly 23 can be provided on the base body 13 and/or on the lid 14 or adjacent thereto, by means of which brake dust can be collected and stored.

It is also expedient, see FIG. 5, if the brake dust collection and storage assembly 23 is fastened to the lid and/or the wheel carrier by means of at least one holder 27 or is formed by the wheel carrier or the lid.

The brake dust collection and storage assembly 23 can optionally comprise a braid 24, in particular a metal braid, which is in particular configured such that it can be replaced, in order to store the brake dust.

The brake dust collection and storage assembly 23 can also comprise a collecting plate 25 extending substantially in circumferential direction, which is in particular configured such that it can be replaced, in order to collect the brake dust. The collecting plate 25 advantageously closes off the spatial region 7 radially and axially to the outside and rests tightly against the brake caliper 8 on a sealing surface 26 or sealing surfaces 26.

The brake pistons 9 advantageously act only in response to pressure and can be implemented in a multi-piston fixed caliper configuration or in a floating piston configuration with primarily one brake piston 9 or with multiple brake pistons 9. It is also advantageous that the brake caliper 8 can radially seal a subsegment of the friction pairing work space between the brake disc 5, 6 and the brake pad 10, 11 as a type of labyrinth seal, so that the emission of brake dust is further limited.

Figure 12:
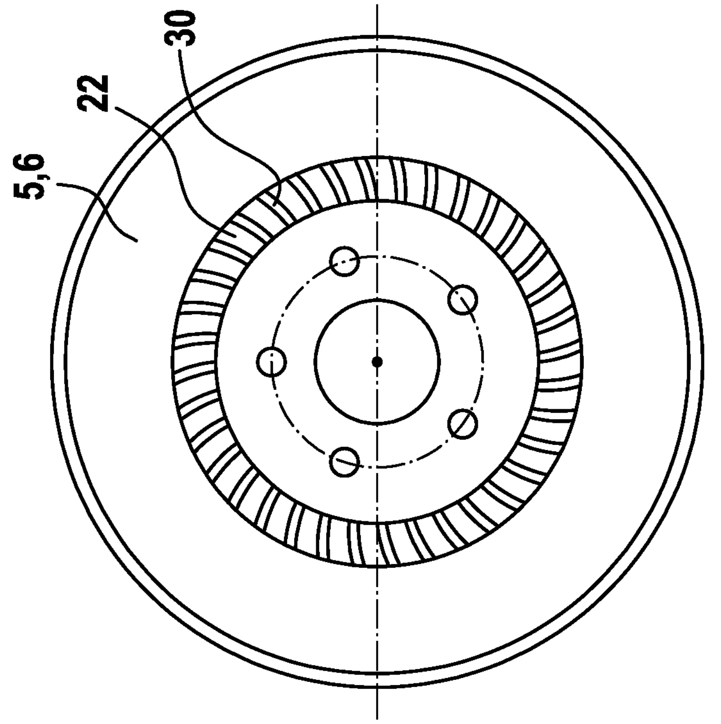
Figure 11:
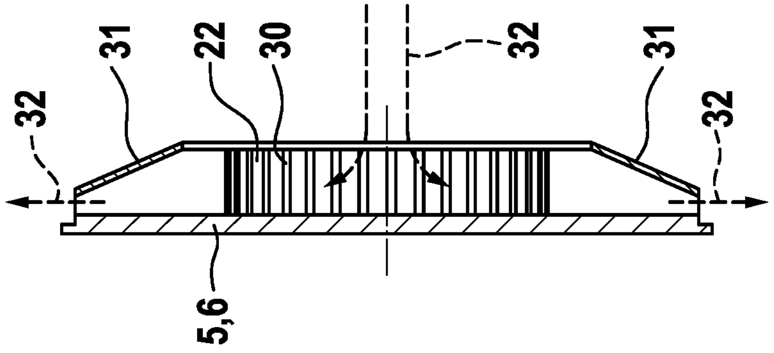

FIGS. 11 and 12 show another embodiment example of a brake disc 5, 6, which is configured such that it has annularly arranged webs 22 that separate grooves 30 from one another on its outer side, so that a fluid stream 32 can flow from radially inside in axial direction and radially outward along the brake disc 5, 6 through the grooves 30 between the webs 22. An annular cover part 31 is provided radially on the outside of the brake disc 5, 6 and arranged spaced apart from the brake disc 5, 6, so that the fluid stream 32 can flow off radially outward between the cover part 31 and the brake disc 5, 6. In FIG. 11, it can be seen that the cover part 31 is conical and approaches the brake disc 5, 6 from radially inside to radially outside and nonetheless leaves a gap or space radially on the outside to allow the fluid stream 32 to flow out. The webs 22 are advantageously forward-curved or alternatively backward-curved or radially aligned.

The cover part 31 is optionally configured and/or connected in a thermally conductive manner for improved heat dissipation.

LIST OF REFERENCE NUMBERS

1 Brake assembly
2 Wheel carrier
3 Rim
4 Wheel
5 Brake disc
6 Brake disc
7 Spatial region
8 Brake caliper
9 Brake piston
10 Brake pad
11 Brake pad
12 Back plate
13 Base body of the brake caliper
14 Lid
15 Inner surface
16 Outer surface
17 Rib
18 Counter bearing
19 Labyrinth seal
20 Cooling air channel
21 Cooling air opening
22 Groove
23 Brake dust collection and storage assembly
24 Braid
25 Collecting plate
26 Sealing surface
27 Holder
28 Manifold
29 Wheel hub
30 Web
31 Cover part
32 Fluid stream

The invention claimed is:

1. A brake assembly of a wheel of a motor vehicle, said brake assembly comprising:

a first brake disc and a second brake disc which are spaced apart from one another, connected to one another in a rotationally fixed manner, and arranged to rotate about a common axis of rotation on a wheel carrier, wherein the first and second brake discs comprise inner surfaces which face toward one another and outer surfaces which face away from one another;

a brake caliper having brake pistons that is axially arranged between the first and second brake discs, wherein the brake caliper extends radially outward over the first and second brake discs and shields a spatial region between the first and second brake discs from outside;

at least one first brake piston configured for applying pressure onto a first arranged brake pad to press the first arranged brake pad against the first brake disc;

at least one second brake piston configured for applying pressure onto a second arranged brake pad to press the second arranged brake pad against the second brake disc; and at least one counter bearing that directly engages on the outer surface of at least one of the first and second brake discs for limiting axial bending of said at least one of the first and second brake discs.

2. The brake assembly according to claim 1, wherein the first and second brake pads are pressed by the first and second brake pistons only against the inner surfaces of the first and second brake discs which face toward one another.

3. The brake assembly according to claim 2, further comprising ribs disposed on the outer surface of one of the first and second brake discs to cool and/or increase a flexural rigidity of said one of the first and second brake discs.

4. The brake assembly according to claim 1, further comprising a labyrinth seal disposed between the brake caliper and a radial outer region of the first and second brake discs to seal the spatial region between the first and second brake discs.

5. The brake assembly according to claim 1, wherein the brake caliper has cooling air channels for passing cooling air into the spatial region.

6. The brake assembly according to claim 1, further comprising a brake dust collection and storage assembly disposed either on or adjacent the brake caliper for collecting brake dust.

7. The brake assembly according to claim 6, wherein the brake dust collection and storage assembly is either (i) fastened to the brake caliper by way of at least one holder or (ii) formed by the brake caliper.

8. The brake assembly according to claim 6, wherein the brake dust collection and storage assembly comprises a replaceable metal braid.

9. The brake assembly according to claim 6, wherein the brake dust collection and storage assembly comprises a replaceable collecting plate.

10. The brake assembly according to claim 1, wherein the brake caliper includes a base body and a lid that extends both above the base body and outwardly from the base body along the common axis.

11. The brake assembly according to claim 10, wherein the lid has cooling air channels for passing cooling air into the spatial region.

12. The brake assembly according to claim 10, wherein base body has cooling air channels for passing cooling air into the spatial region.

13. The brake assembly according to claim 1, wherein the counter bearing is at least partially positioned within the brake caliper.

14. The brake assembly according to claim 1, wherein the counter bearing directly engages on the outer surface of the first brake disc for limiting axial bending of said first brake disc.

15. The brake assembly according to claim 14, wherein the outer surface of the first brake disc is positioned between the counter bearing and the first brake piston.

16. The brake assembly according to claim 14, wherein the counter bearing urges the outer surface of the first brake disc in a first direction and the first brake piston urges the first brake disc in a second direction that is opposite the first direction.

17. The brake assembly according to claim 14, wherein the first brake disc and the counter bearing are positioned within a recess formed in the brake caliper, and wherein the first brake piston is not positioned within the recess.

18. The brake assembly according to claim 1, wherein the counter bearing is floating caliper.

19. The brake assembly according to claim 1, wherein the at least one counter bearing comprises (i) a first counter bearing that directly engages on the outer surface of the first brake disc for limiting axial bending of said first brake disc and (ii) a second counter bearing that directly engages on the outer surface of the second brake disc for limiting axial bending of said second brake disc.

20. The brake assembly according to claim 19, wherein the first counter bearing urges the first brake disc in a first direction and the second counter bearing urges the second brake disc in a second direction that is opposite to the first direction.

21. The brake assembly according to claim 19, wherein the first counter bearing is mounted within a first leg of the brake caliper and the second counter bearing is mounted within a second leg of the brake caliper, wherein the first and second legs of the brake caliper are disposed on opposing sides of the brake caliper.

* * * * *